(12) United States Patent
Lorusso

(10) Patent No.: US 10,415,541 B1
(45) Date of Patent: Sep. 17, 2019

(54) TORQUE-GENERATING APPARATUS POWERED BY PISTON BUOYANCY

(71) Applicant: Stephen John Lorusso, Naples, FL (US)

(72) Inventor: Stephen John Lorusso, Naples, FL (US)

(73) Assignee: Ark Colossus, LLC, Cheyenne, WY (US)

( * ) Notice: Subject to any disclaimer, the term of this patent is extended or adjusted under 35 U.S.C. 154(b) by 54 days.

(21) Appl. No.: 15/876,768

(22) Filed: Jan. 22, 2018

Related U.S. Application Data (60) Provisional application No. 62/449,485, filed on Jan. 23, 2017.

(51) Int. Cl.
*F03B 17/02* (2006.01)

(52) U.S. Cl.
CPC ............ *F03B 17/025* (2013.01); *F03B 17/02* (2013.01); *F05B 2210/401* (2013.01)

(58) Field of Classification Search
CPC ........ F03B 17/02; F03B 17/025; F03B 17/04; F03B 17/005; F03B 13/187; F03B 13/1875; F05B 2210/401; F04B 35/004
See application file for complete search history.

(56) References Cited

U.S. PATENT DOCUMENTS

| | | | |
|---|---|---|---|
| 3,961,479 A | 6/1976 | Anderson | |
| 4,185,464 A | 1/1980 | Rainey | |
| 4,407,130 A | 10/1983 | Jackson | |
| 4,683,720 A | 8/1987 | De Shon | |
| 4,726,188 A | 2/1988 | Woolfolk | |
| 5,996,344 A | 12/1999 | Frenette et al. | |
| 6,817,180 B2 | 11/2004 | Newman | |
| 8,011,182 B2 * | 9/2011 | Hastings | F03B 17/025 290/1 R |
| 2008/0264056 A1 * | 10/2008 | Tung | F03B 17/02 60/496 |
| 2009/0127866 A1 | 5/2009 | Cook | |
| 2010/0170242 A1 | 7/2010 | Irps | |

(Continued)

FOREIGN PATENT DOCUMENTS

| | | | | |
|---|---|---|---|---|
| DE | 10109870 A1 | * | 1/2002 | ............ F03B 13/142 |
| GB | 2229228 A | * | 9/1990 | ............ F03B 17/02 |
| JP | 57126573 A | * | 8/1982 | ............ F03B 17/025 |

*Primary Examiner* — Mark A Laurenzi
*Assistant Examiner* — Xiaoting Hu
(74) *Attorney, Agent, or Firm* — Michael P. Fortkort; Michael P Fortkort PC (57) ABSTRACT

An apparatus powered by piston buoyancy is provided to generate rotary power by utilizing the effects of buoyancy and includes a tank containing a volume of liquid below a liquid level. A crankshaft is provided and is rotatably mounted to the tank above the liquid level. The crankshaft includes a rotatable main shaft. A hollow piston is disposed within the liquid in the tank and is provided having an interior cavity, an open bottom and one or more movable trap doors located at the top of the piston. A piston rod connects the hollow piston to a section of the crankshaft offset from a longitudinal axis of the main shaft. A gas supply system is provided having an outlet positioned beneath the open bottom end of the piston to supply gas to the interior cavity of the hollow piston and cause the piston to move upward and rotate the crankshaft.

18 Claims, 10 Drawing Sheets

(56) References Cited

U.S. PATENT DOCUMENTS

2011/0162356 A1\* 7/2011 Hastings ................ F03B 17/02
60/495
2016/0215753 A1\* 7/2016 Westmoreland .......... F03G 3/00

\* cited by examiner

TORQUE-GENERATING APPARATUS POWERED BY PISTON BUOYANCY

CROSS-REFERENCE TO RELATED APPLICATIONS

This application claims the benefit of U.S. Provisional Patent Application Ser. No. 62/449,485, filed on Jan. 23, 2017, which is incorporated herein in its entirety.

FIELD OF THE INVENTION

The present invention relates generally to alternative power sources and, more particularly, to a gas-powered apparatus utilizing the effects of buoyancy to provide mechanical power.

BACKGROUND OF THE INVENTION

In many areas of the world, common power sources such as electricity or power from fossil fuel driven devices are not available. Additionally, some societies are trying to move away from polluting sources of power and are gravitating to alternative non-polluting sources such as solar, wind and hydro or micro-hydro power sources.

All of these non-polluting, alternative power sources rely on climatic conditions or other variables in the environment to provide the driving forces for their power. In cloudy weather conditions, solar power source is ineffective. In turn, wind and water sources can be unpredictable and often unavailable. Thus, in practice, alternative power sources may be unreliable in certain geographical areas.

Some attempts have been made to utilize the buoyant effects of a fluid such as tidal fluctuations in sea water or buoyant effects of objects submerged in tanks of water to drive power systems. However, most of these systems are subject to prohibitive amounts of drag by being completely immersed in the host water, have high maintenance costs and are thus inefficient.

Accordingly, there remains a need for alternative power sources which solve at least one of the aforementioned problems. Especially, there is an ongoing need for a power source which is non-polluting, efficient, reliable, and minimally dependent or non-dependent on environmental conditions.

SUMMARY OF THE INVENTION

The present invention is directed to a gas-powered apparatus or engine that utilizes the effects of a buoyant force between two materials having different densities to rotate and power an associated crankshaft. The gas-powered apparatus includes a tank containing a volume of liquid (e.g., water) below a predetermined liquid level and a crankshaft rotatably mounted to the tank and positioned above the predetermined water level, the crankshaft having a main shaft that is formed along a longitudinal axis and is rotatable about the longitudinal axis. The gas-powered apparatus additionally includes a hollow piston defining an interior cavity, the hollow piston being disposed within the liquid in the tank and additionally including a movable top located at the top of the piston providing a valve-like closure to the top of the piston. The piston further includes an open bottom. A piston rod connects the hollow piston to the crank pin. A gas supply system is provided for supplying a gas having a density less than that of the liquid to the interior cavity of the piston, the gas supply system having an outlet positioned beneath the open bottom end of the piston.

In a first implementation of the invention, a gas-powered apparatus comprises a volume of liquid disposed below a liquid level. The apparatus further comprises a crankshaft provided with a main shaft extending along a longitudinal axis and rotatable about the longitudinal axis. One or more hollow pistons are movably disposed within the liquid and connected to the crankshaft offset from the longitudinal axis of the main shaft. Each piston has an interior cavity, a movable top arranged at a top area of the piston, and a bottom. The apparatus further includes a gas supply system for selectively injecting gas to the interior cavity of each piston of the one or more hollow pistons, the gas having a density less than that of the liquid. The apparatus is configured to adopt a first configuration in which the gas supply system is injecting gas into the interior cavity of at least one piston of the one or more hollow pistons while the movable top of the at least one piston is arranged in a closed position preventing fluid flow between the interior cavity and the outside of the piston through the top area of the piston. In this first configuration, the gas injected into the interior cavity provides buoyancy to the at least one piston driving the at least one piston upward exerting a torque on the crankshaft.

In a second aspect, when the apparatus is in the first configuration, the bottom of the at least one piston can be open and the gas supply system can be injecting gas into the interior cavity through the open bottom forcing liquid out of the interior cavity through the open bottom.

In another aspect, the crankshaft can be rotatably mounted above the liquid level.

In another aspect, the movable top can be configured to remain in the closed position by the effect of pressure exerted on the movable top by water arranged outside the piston and adjacent to the movable top.

In another aspect, the movable top can include one or more movable trap doors.

In yet another aspect, the movable trap doors are freely pivotable.

In another aspect, the apparatus can be configured to adopt a second configuration in which the at least one piston is arranged vertically higher than in the first configuration and at least partially above the liquid level, and further in which pressure of the gas injected into the interior cavity is opening the movable top allowing the gas injected into the interior cavity to exit the interior cavity through the top area of the piston.

In another aspect, the apparatus can be configured to adopt a further configuration in which the at least one piston is moving downward along the volume of liquid with the movable top in an open position allowing liquid to flow through the piston, via the bottom and the top area of the piston.

In yet another aspect, the quotient of the weight of the at least one piston divided by the volume of the at least one piston can be greater than the density of the liquid, such that the at least one piston moves downward at least partially due to gravity, driving the crankshaft.

In another aspect, the bottom of each piston can be permanently open.

In another aspect, the apparatus can further include a respective piston rod connecting each piston of the one or more hollow pistons to a respective section of the crankshaft offset from the longitudinal axis of the main shaft.

In another aspect, the gas supply system can include a respective outlet positioned beneath the bottom of each piston of the one or more hollow pistons.

In yet another aspect, the liquid can include water.

In another aspect, the gas can include air.

In another aspect, the one or more hollow pistons can include two or more hollow pistons (e.g., four hollow pistons). Each piston of the two or more hollow pistons can be connected to respective sections of the crank shaft angularly spaced apart a constant angle (e.g., 90 degrees) from one another about the longitudinal axis of the main shaft.

In yet another aspect, each piston of the two or more hollow pistons can be connected to the respective section of the crank shaft by a respective piston rod.

In another aspect, each respective piston rod can include a shaft connected to the respective section of the crank shaft and a saddle rotatably connected to the each piston.

In another aspect, the apparatus can further include a set of vertical rails and each piston of the one or more hollow pistons includes linear bushings movably mounted to the set of vertical rails.

In another implementation of the invention, a gas-powered apparatus comprises a tank containing a volume of liquid below a predetermined liquid level. A crankshaft is rotatably mounted above the liquid level. The crankshaft has a main shaft extending along a longitudinal axis and rotatable about the longitudinal axis. One or more hollow pistons are movably disposed within the liquid in the tank and connected to the crankshaft offset from the longitudinal axis of the main shaft. Each piston is provided with an interior cavity, a movable top arranged at a top area of the piston, and an open bottom. The apparatus further includes a gas supply system for selectively injecting gas to the interior cavity of each piston of the one or more hollow pistons, the gas having a density less than that of the liquid. The apparatus is configured to adopt a first configuration in which the gas supply system is injecting gas into the interior cavity of at least one piston of the one or more hollow pistons while the movable top of the at least one piston is arranged in a closed position preventing fluid flow between the interior cavity and the outside of the piston through the top area of the piston. In this first configuration, the gas injected into the interior cavity provides buoyancy to the at least one piston driving the at least one piston upward exerting a torque on the crankshaft.

In yet another implementation of the invention, a method of rotating a crankshaft comprises an initial step of providing a tank having a rotatable crankshaft, the crankshaft having a main shaft extending along a longitudinal axis and rotatable about the longitudinal axis, the tank further containing one or more movable, hollow pistons connected to the crankshaft offset from the longitudinal axis of the main shaft, each piston of the one or more hollow pistons having an interior cavity, a movable top arranged at a top area of the piston, and an open bottom. The tank is filled with a liquid up to a liquid level arranged beneath the crankshaft such that the one or more pistons are disposed within the liquid. Next, at least one piston of the one or more hollow pistons is positioned at a bottom position within the tank. Gas is then injected into the interior cavity of the at least one piston while the movable top of the at least one piston is arranged in a closed position preventing fluid flow between the interior cavity and the outside of the piston through the top area of the piston. This gas injection causes the at least one piston to rise within the tank to rotate the section of the crankshaft about the longitudinal axis of the main shaft of the crankshaft. When the at least one piston reaches the liquid level, the movable top is allowed to open due to an underlying pressure from the gas contained within the interior cavity of the at least one piston, and gas is allowed to be released from the interior cavity of the at least one piston. The section of the crankshaft is continued to rotate about the longitudinal axis of the main shaft of the crankshaft as the at least one piston sinks through the liquid in the tank with the movable top open in an open position allowing liquid to flow through the piston, via the open bottom and the top area of the piston.

These and other objects, features, and advantages of the present invention will become more readily apparent from the attached drawings and the detailed description of the preferred embodiments, which follow.

BRIEF DESCRIPTION OF THE DRAWINGS

The preferred embodiments of the invention will hereinafter be described in conjunction with the appended drawings provided to illustrate and not to limit the invention, where like designations denote like elements, and in which.

Like reference numerals refer to like parts throughout the several views of the drawings.

DETAILED DESCRIPTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Shown throughout the figures, the present invention is directed toward an engine or apparatus for converting a vertical lift due to the effects of buoyancy into mechanical energy and, more specifically, into rotational energy to drive an electric generator, pump or other apparatus requiring a rotating drive system.

Figure 1:
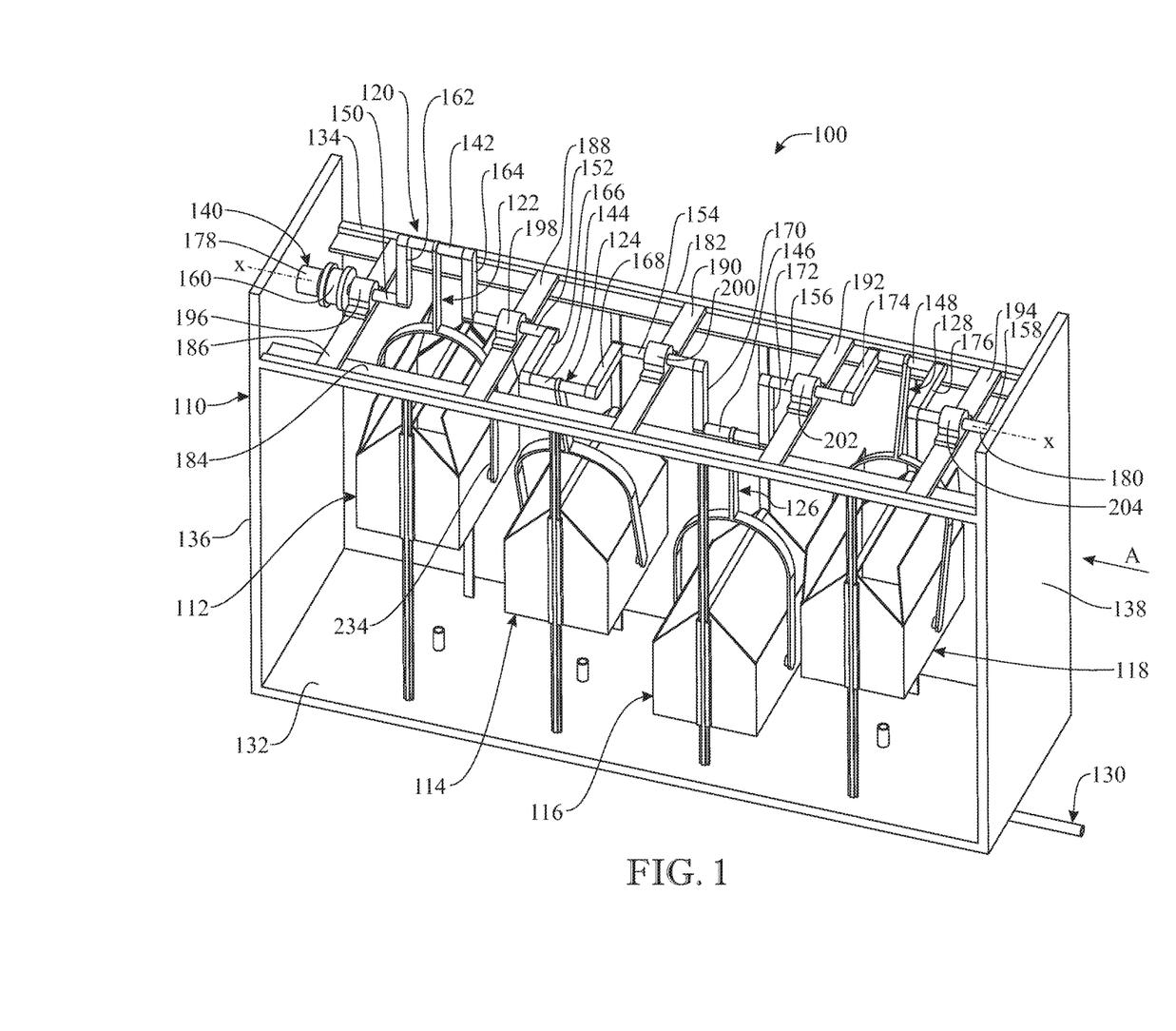
FIG. 1 presents a top, front isometric view of a gas-powered apparatus in accordance with one embodiment of the present invention, with a front panel removed.
Figure 2:
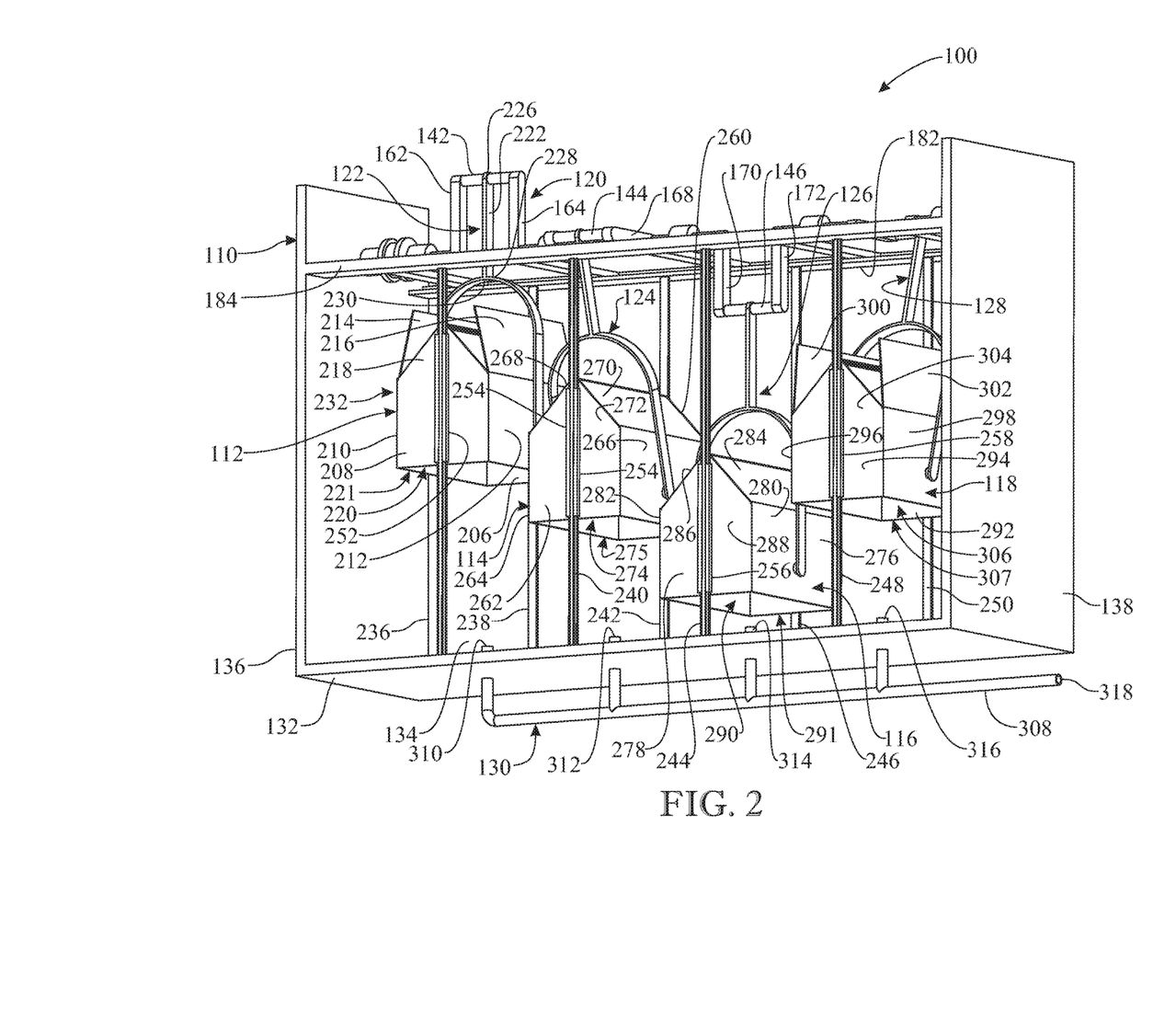
FIG. 2 presents a bottom, front isometric view of the gas-powered apparatus of FIG. 1.

Referring initially to FIGS. 1 and 2, a gas or gas-powered apparatus 100 is illustrated in accordance with an exemplary embodiment of the present invention, configured as a buoyancy-driven engine. As shown, the gas-powered apparatus 100 generally includes a liquid-containing housing or tank 110 having multiple hollow pistons, such as a first piston 112, a second piston 114, a third piston 116 and a fourth piston 118, disposed therein. A crankshaft 120 is rotatably mounted on the tank 110 above the pistons. The pistons are provided to sequentially float and sink within the tank 110 in order to rotate the crankshaft 120 and provide rotational energy to external devices. The first piston 112 is connected to the crankshaft 120 by means of a first piston rod 122. Likewise, the second, third and fourth pistons 114, 116 and 118 are also connected to the crankshaft 120 by respective second, third and fourth piston rods 124, 126 and 128. A gas supply system 130 is provided to sequentially inject a combination of one or more gases (e.g., air) into the pistons causing them to float upwards within the tank 110 and thus rotate the crankshaft 120 to provide rotational energy in a manner described in more detail hereinbelow.

The tank 110 of the present embodiment generally includes a bottom 132, a back wall 134 and first and second side walls 126 and 128, respectively. The tank 110 additionally includes a front wall (not shown) which has been removed to illustrate the inner workings of the gas-powered apparatus 100. The bottom 132, the back wall 134, the first and second side walls 136 and 138 and the front wall form a fluid tight chamber for containing a predetermined amount of fluid such as, but not limited to, water. In alternative embodiments, the shape and/or size of the tank may vary.

Referring primarily to FIG. 1, the crankshaft 120 generally includes a main shaft 140 supporting a plurality of crank pins, such as a first crank pin 142, a second crank pin 144, a third crank pin 146 and a fourth crank pin 148, radially offset from the main shaft 140. The main shaft 140 is divided into longitudinally spaced apart first, second, third, fourth and fifth shaft sections 150, 152, 154, 156 and 158, respectively.

The individual crank pins are connected to the shaft sections by arms. For example, the first crank pin 142 is connected to and between the first and second shaft sections 150 and 152 by a pair of arms 162 and 164. Likewise, the second crank pin 144 is connected to and between the second and third shaft sections 152 and 154 by arms 166 and 168. Similarly, the third crank pin 146 is connected to and between the third and fourth shaft section 154 and 156 by arms 170 and 172 and the fourth crank pin 148 is connected to and between the fourth and fifth shaft section 156 and 158 by arms 174 and 176. The main shaft 140 has a first end 178 rotatably mounted within the first side wall 136 of the tank 110 while a second end 180 of the main shaft 140 is rotatably mounted within the second side wall 138 of the tank 110. While not specifically shown, a flywheel may be mounted to the first or second ends 178 or 180 of the main shaft 140 to smooth out any pulsations due to the reciprocal motions of the pistons as they rotate the main shaft.

It should be noted that the first shaft section 150 of the main shaft 140 of the crankshaft 120 includes a pulley or take-off wheel 160. The take-off wheel 160 is provided to accept a belt, chain, sprocket or other known element for transferring the rotational energy of the crankshaft 120 to an external device. Alternative embodiments are contemplated, however, in which a portion of at least one of the first end 178 and the second end 180 of the main shaft 140 can protrude through the respective first or second side wall 136 and 138 outside the unit. A generator power shaft, a take-off wheel 160 or other mechanism for receiving or transferring the rotational power of the crankshaft 120 may be provided on the protruding portion of the first end 178 or second end 180.

With further reference to FIG. 1, it should be noted that the first, second, third, fourth and fifth shaft sections 150, 152, 154, 156 and 158 of the main shaft 140 of the crank shaft 120 lie along a common longitudinal axis x-x. The first, second, third and fourth crank pins 142, 144, 146 and 148, respectively, are angularly spaced from each other at 90-degree intervals about the x-x longitudinal axis. Thus, when viewed looking into the second side wall 138 in the direction of arrow "A", initially, the first crank pin 142 is at the 12 o'clock or 90-degree position, the second crank pin 144 is in the 9 o'clock or 180-degree position, the third crank pin 146 is in the 6 o'clock or 270-degree position and the fourth crank pin 148 is in the 3 o'clock or 0-degree position.

With continued reference to FIGS. 1 and 2, the tank 110 additionally includes a pair of support rails 182 and 184 extending between the first and second side walls 136 and 138. As best seen in FIG. 1, the main shaft 140 of the crankshaft 120 is further rotatably supported on the tank 110 by a series of cross bars 186, 188, 190, 192 and 194 extending between the support rails 182 and 184. The first shaft section 150 of the main shaft 140 is rotatably supported on the cross bar 186 by a journal 196. Similarly, the second, third, fourth and fifth shaft sections 152, 154, 156 and 158 are rotatably supported on respective cross bars 188, 190, 192 and 194 by respective journals 198, 200, 202 and 204.

Referring now to FIG. 2, the disclosed hollow pistons are configured to receive a gas such as, but not limited to, air, and utilize the effect of buoyancy to raise the pistons through water in the tank 110 to rotate the crank shaft 120. For instance, in the present embodiment, the first piston 112 includes a back wall 206, a front wall 208 and side walls 210 and 212. A pair of movable trap doors 214 and 216 are provided to open and close the top of the first piston 112 in order to retain and release gas as described in more detail hereinbelow. The trap doors 214 and 216 can be freely movable as will described in greater detail hereinafter. As shown, the front wall 208 has an upper triangular section 218. While not specifically visible, the back wall 206 has a similar upper triangular section. The trap door 214 is pivotally mounted to the side wall 210 while the trap door 216 is pivotally mounted to the side wall 212. When in the closed position, the trap doors 214 and 216 lie against the edges of the upper triangular section 218 of the front wall 208 and the upper triangular section of the back wall 206 to seal the first piston 112 against any gas leakage. The back wall 206, the front wall 208 and side walls 210 and 212 together with the trap doors 214 and 216 define an interior cavity 220 in the piston 112 having a predetermined volume for receipt of gas from the gas supply system 130. The piston 112 further includes an open bottom 221, such that the interior cavity 220 is in permanent fluid communication with an outside of the piston 112 via the open bottom 221.

The trap doors 214 and 216 may be pivotally connected to the side walls 210 and 212, respectively, by a variety of means such as, for example, living hinges, sealed piano type hinges, etc. The first piston 112 is preferably formed from a material having a greater density than the surrounding water, which will commonly have a density of 0.99802 grams per cubic centimeter or 62.300 lbs. per cubic foot at an operating room temperature of 700 Fahrenheit; for example, the first piston 112 can be made of non-corroding stainless steel. This contributes to the trap doors 214 and 216 remaining closed against the upward buoyancy force of the gas pressure from within the interior cavity 220 and opening when water pressure is removed from the trap doors 214 and 216 as the first piston 112 reaches the top of its cycle as described in more detail hereinbelow. By having a greater density than the surrounding water, in the absence of gas within the interior cavity 220, the first piston 112 also naturally sinks down through the water column to pull down on the first crank pin 142 thereby further providing energy to rotate the crankshaft 120 through the first piston rod 122 during that portion of the cycle.

The first piston rod 122 includes a vertical bar or shaft 222 connected to the first crank pin 142 and a U-shaped collar or saddle 224 connected to the first piston 112. Specifically, a first end 226 of the shaft 222 is rotatably connected to the first crank pin 142 while a second end 228 of the shaft 222 is affixed to a center point 230 of the saddle 224. Free ends 232 and 234 of the saddle 224 are pivotally connected to the side wall 210 and 212, respectively, of the first piston 112 (see also FIG. 3). These rotatable and pivotal connections allow the first piston rod 122 to oscillate as the vertical rise and fall of the first piston 112 rotates the crankshaft 120.

Since the disclosed pistons are not constrained within any type of cylinder walls, in order to maintain a pure vertical motion of the pistons, the tank 110 includes front and back pairs of vertical rails 236 and 238, 240 and 242, 244 and 246 and 248 and 250. The pistons include front and back linear bushings for engagement with these vertical rails. For example, the first piston 112 includes a front linear bushing 252 on the front wall 208 for engagement with vertical rail 236. Likewise, the second, third and fourth pistons 114, 116 and 118 include respective front linear bushings 254, 256 and 258 for engagement with the vertical rails 240, 244 and 248, respectively. While not specifically shown, the first, second, third and fourth pistons 112, 114, 116 and 118 additionally include rear linear bushings for engagement with the back vertical rails 238, 242, 246 and 250, respectively.

The second, third and fourth pistons 114, 116 and 118 are constructed identical to the first piston 112. Thus, the second piston 114 includes a back wall 260, a front wall 262, side walls 264 and 266, trap doors 268 and 270 and triangular portion 272 all defining an interior cavity 274 having a volume, and an open bottom 275. Similarly, the third piston 116 includes a back wall 276, a front wall 278, side walls 280 and 282, trap doors 284 and 286, and a triangular portion 288 all defining an interior cavity 290 having an internal volume, and an open bottom 291. Likewise, the fourth piston 118 also has a back wall 292, a front wall 294, side walls 296 and 298, trap doors 300 and 302 and a triangular portion 304 all defining an interior cavity 306 having an internal volume, and an open bottom 307.

As best shown in FIG. 2, in order to selectively and sequentially fill the interior cavities 220, 274, 290 and 306 of the first, second, third and fourth pistons 112, 114, 116 and 118, respectively, with air or other gas, the gas supply system 130 has a manifold 308 having outlets 310, 312, 314 and 316 positioned directly below the first, second, third and fourth pistons 112, 114, 116 and 118, respectively. Valves (not shown) may be provided to control the flow of gas into the respective interior cavities 220, 274, 290 and 306 of the first, second, third and fourth pistons 112, 114, 116 and 118. The gas supply system 130 includes an inlet end 318 for receipt of air or other gas from an external supply source.

Figure 3:
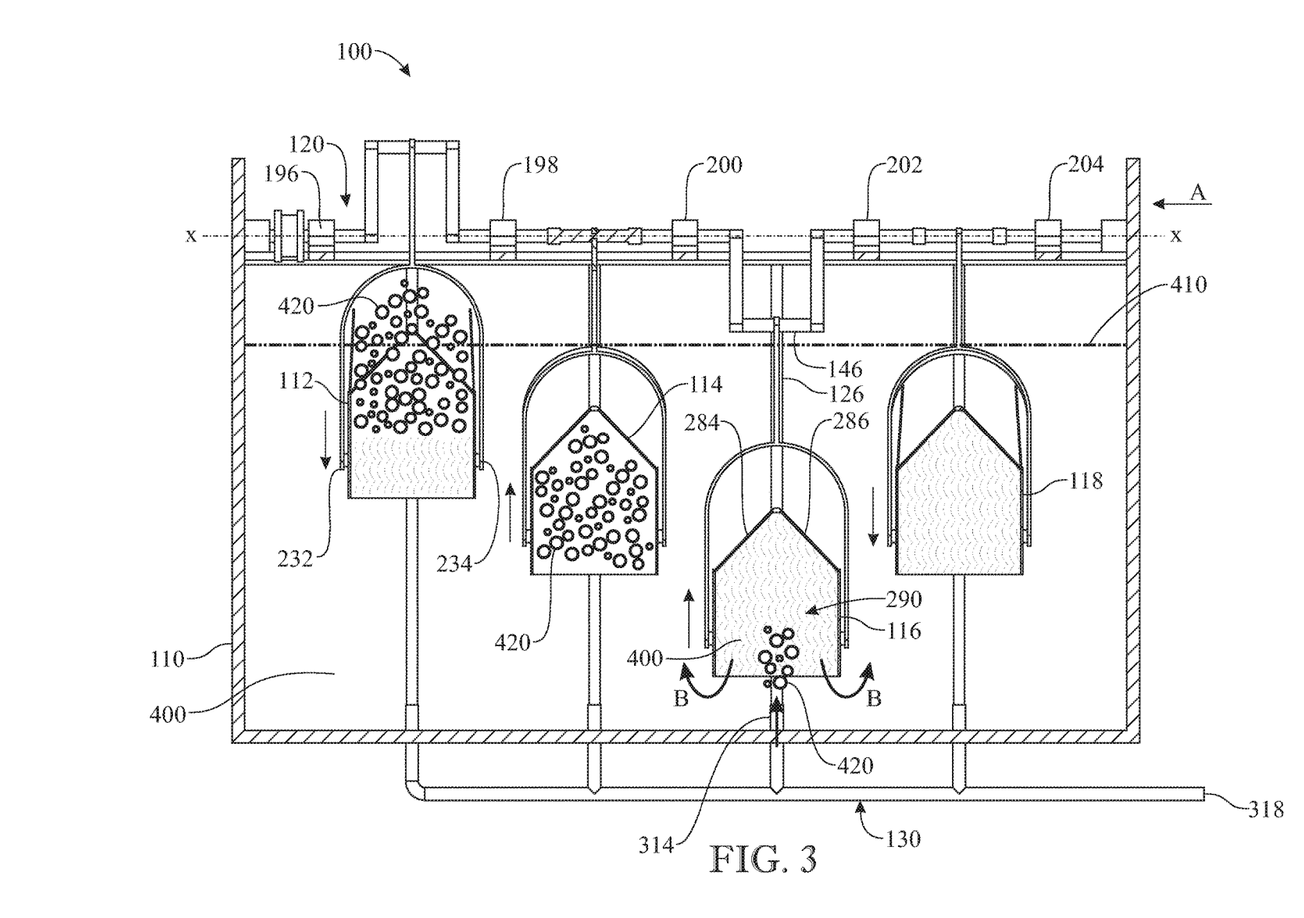
FIG. 3 presents a cross-sectional front elevation view of the gas-powered apparatus of FIG. 1 in a first stage of a power cycle.

Referring now to FIGS. 3-10, and initially with regard to FIG. 3, the operation of the gas-powered apparatus 100 will now be described. The following description is given with regard to a complete cycle of the third piston 116. Initially, the tank 110 is filled with water 400 up to a predetermined water level 410. As shown, the crank shaft 120 is positioned entirely above the water level 410. This provides several advantages, the first of which being that the rotational movement of the crankshaft 120 is not subject to any drag due to immersion in or contact with the underlying water 400. This maximizes power to the drive wheel 160 and thus to an external device. Additionally, by positioning the crankshaft 120 above the water level 410, the maintenance on the crankshaft 120 and associated journals 196, 198, 200, 202 and 204 is dramatically reduced as they are not subject to any detrimental effects of the water 400.

With continued reference to FIG. 3, as shown, the third piston 116 is at its lowest position within the tank 110 and the associated crank pin 146 of the crank shaft 120 is at a 270-degree position when viewed in the direction of arrow A. To initiate rotation of the crankshaft 120, a combination of one or more gases (e.g., air), hereinafter referred to as gas 420, is initially injected into the interior cavity 290 of the third piston 116. Specifically, the gas supply system 130 receives gas 420 at the inlet end 318 and releases the gas 420 into the interior cavity 290 of the third piston 116 through the outlet 314. As the gas 420 enters the interior cavity 290, water 400 is displaced or forced out of the interior cavity 290 allowing the interior cavity 290 to begin to fill with the gas 420.

As noted hereinabove, the gas-powered apparatus 100 utilizes the effect of buoyancy to move the pistons through the water column. Buoyancy is generically described as an upward force exerted by a fluid that opposes the weight of an immersed object. Archimedes principle states that the buoyancy force experienced by an object immersed in a fluid is equal to the weight of the fluid displaced by the immersed object. Since weight is equal to the volume of the object times the density of the material of the object and multiplied by the local gravity, the weight of the empty third piston 116 is greater than the volume of water displaced by the physical volume of the third piston 116. This means, absent any gas in the interior cavity 290 of the third piston 116, the third piston 116 sinks within the water column. By removing the constants, i.e., gravity and volume of the object (which is the same as the volume of the displaced fluid or water), if the density of the submerged object is greater than that of the surrounding water 400, the object sinks and if the total density of the submerged object is less than that of the surrounding water the object "floats" or is forced upward in the water column. In the event that the gas is air, at sea level and 700 operating temperature, air has a density of approximately 0.0748 pounds per cubic foot, substantially less than the 62.3 pounds per cubic foot of the surrounding water. Thus, when the interior cavity 290 of the piston 116 contains gas (air) which has a density substantially less than the surrounding water 400, the total weight of the combined third piston 116 and gas 420 contained within the interior cavity 290 is less than the weight of the water displaced by the third piston 116 (including the water displaced out of the interior cavity 290 of the third piston 116). In short, filling the interior cavity 290 with gas, and displacing the water out of the interior cavity 290 (as indicated by arrows B), increasing the overall volume of water displaced by the now gas filled third piston 116. This starts to render the combined density (combined weight divided by combined volume) of the third piston 116 and gas 420 in the interior cavity 290 significantly lower than the density of the surrounding water, and starts to increase the buoyancy of the third piston 116.

Figure 4:
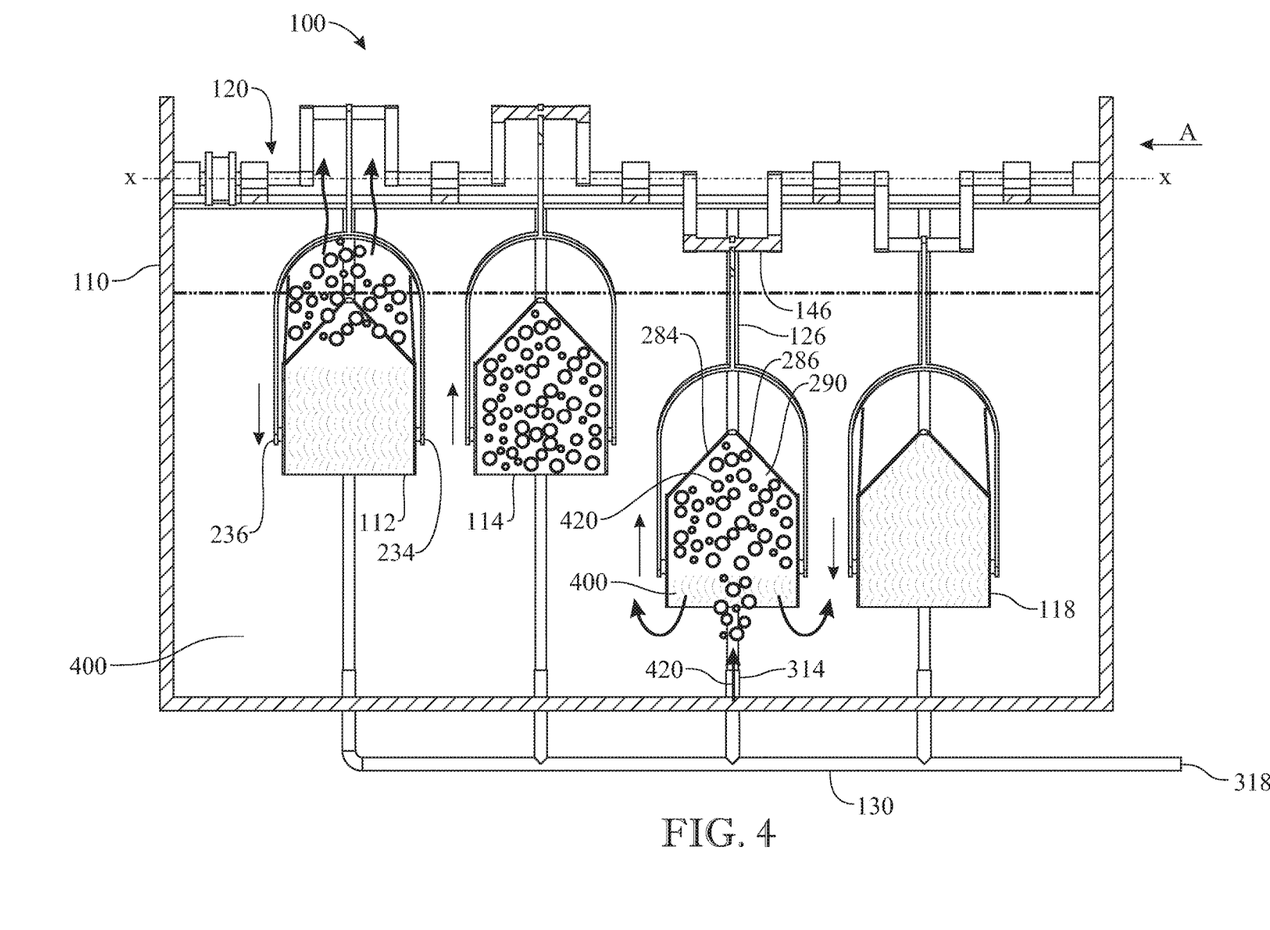
FIG. 4 presents a cross-sectional front elevation view of the gas-powered apparatus of FIG. 1 in a second stage of the power cycle.

Referring to FIG. 4, as the combined density of the third piston 116 and gas 420 contained within the interior cavity 290 of the third piston 116 becomes less than the surrounding water 400, the third piston 116 starts to rise upward within the water column; i.e. the third piston 116 and gas 420 contained within the interior cavity 290 are now being "buoyed up" by the force of the surrounding water 400. As the third piston 116 moves upward along the water 400, the water pressure on the trap doors 284 and 286 (exerted by the water 400 immediately above the trap doors 284 and 296) is sufficient to keep the trap doors 284 and 286 closed maintaining the gas 420 within the interior cavity 290 of the third piston 116. In FIG. 4 the crank pin 146 of the crankshaft 120 has rotated 45° clockwise to a position of 225°. As gas 420 continues to be injected into the interior cavity 290 of the third piston 116, water 400 continues to be displaced out of the interior cavity 290 increasing the buoyancy of the third piston 116 and driving the crankshaft 120 through the third piston rod 126.

Figure 5:
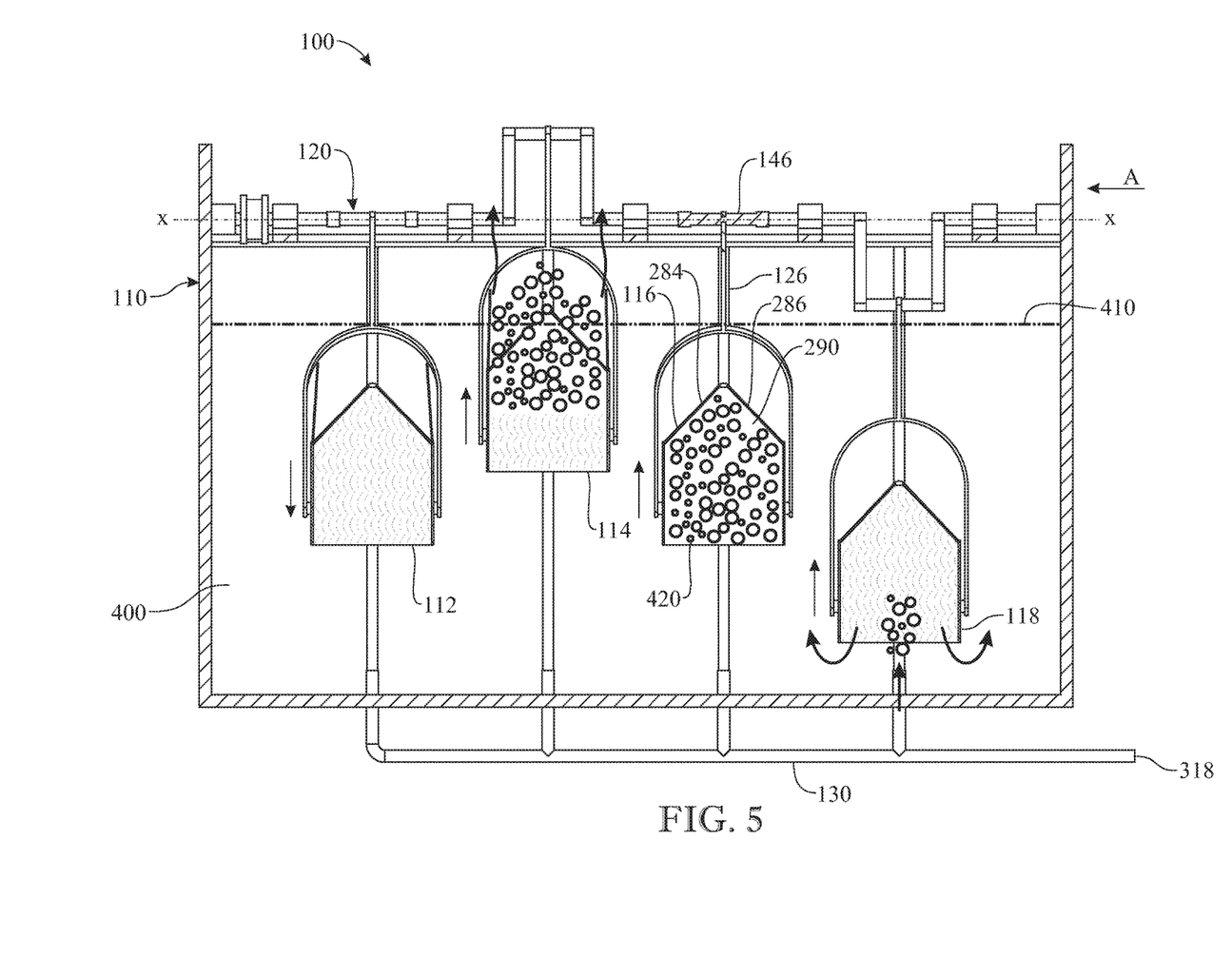
FIG. 5 presents a cross-sectional front elevation view of the gas-powered apparatus of FIG. 1 in a third stage of the cycle.

Referring now to FIG. 5, it can be seen that the gas 420 has completely filled the interior cavity 290 of the third piston 116 maximizing the buoyant effect of the surrounding water 400. At this point, the gas supply system 130 ceases to supply gas to the interior cavity 290 of the third piston 116. The crank pin 146 has now rotated to a 180° position. The third piston 116 continues to move upward, and the pressure of the water 400 on the trap doors 284 and 286 continues to force the trap doors 284 and 286 closed against the gas 420 in the interior cavity 290.

Figure 6:
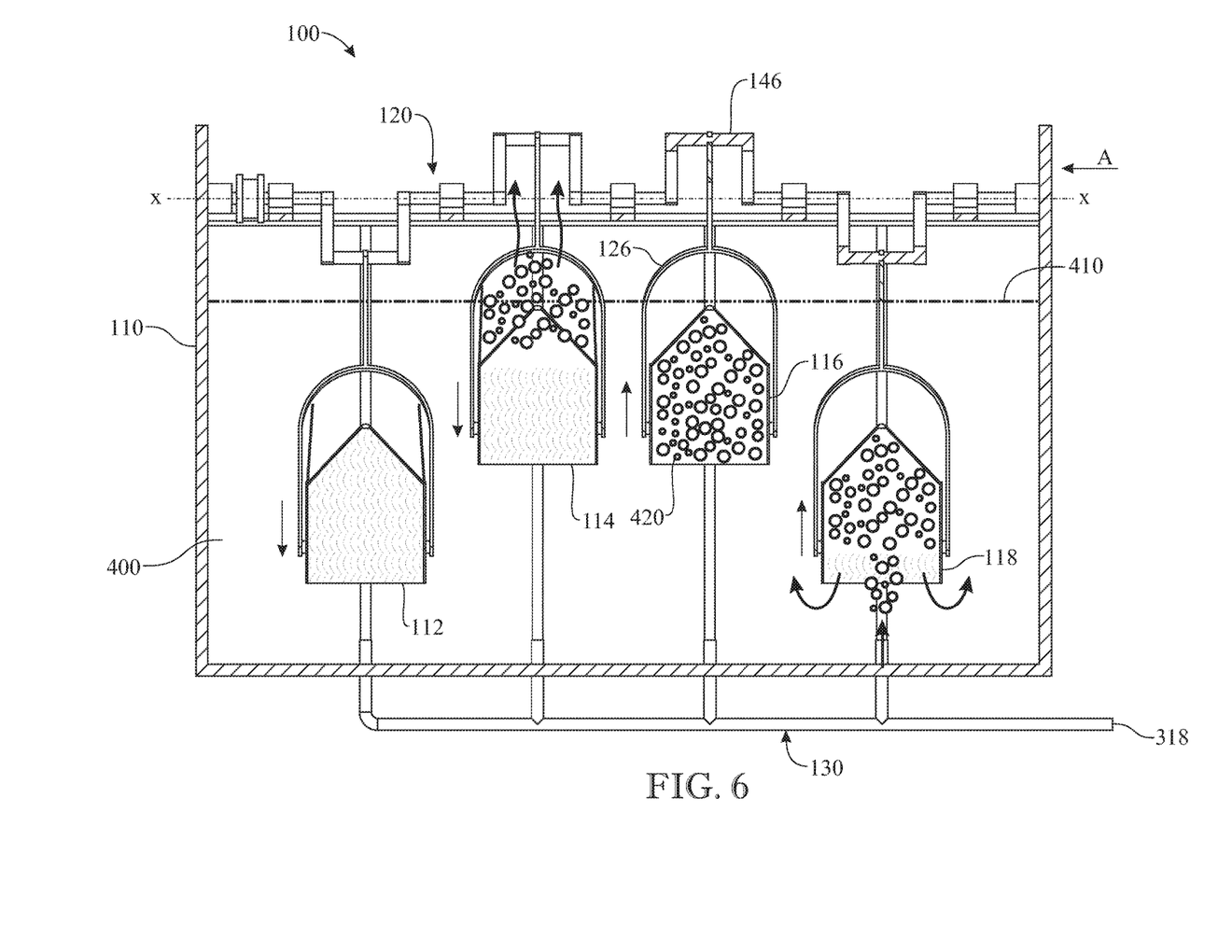
FIG. 6 presents a cross-sectional front elevation view of the gas-powered apparatus of FIG. 1 in a fourth stage of the power cycle.

Turning now to FIG. 6, the completely gas filled, third piston 116 continues to rise up through the water column rotating the third crank pin 146 to a position of 135° thereby continuing to rotate the crankshaft 120. The pressure of the surrounding water 400 continues to maintain the trap doors 284 and 286 in the closed position. The top of the third piston 116 is almost at the water level 410.

Figure 7:
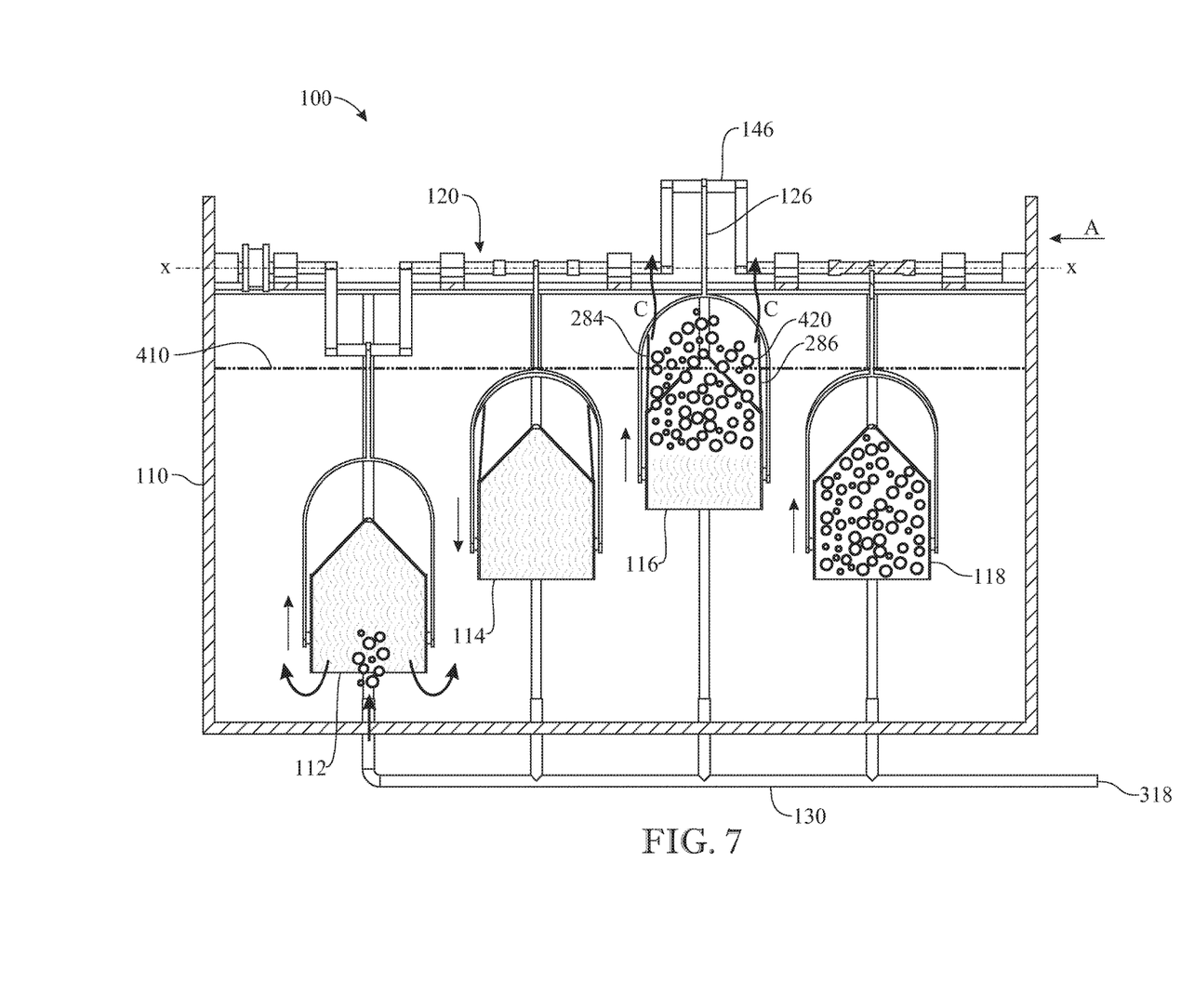
FIG. 7 presents a cross-sectional front elevation view of the gas-powered apparatus of FIG. 1 in a fifth stage of the power cycle.

As best shown in FIG. 7, once the third piston 116 starts to extend above the water level 410, the water pressure is gradually released off of the trap doors 284 and 286 allowing them to open up due to the underlying gas pressure of the gas 420 contained within the interior cavity 290 of the third piston 116. As the trap doors 284 and 286 open up, the water 400 underneath the gas 420 housed in the interior cavity 290 displaces the gas 420 upward. In consequence, the gas 420 thus begins to escape from the interior cavity 290 of the third piston 116 to a space located above the water level 410, as indicated by arrows C. Eventually, the third piston 116 reaches its highest position, shown in the figure, in which the third piston 116 has moved the crankpin 146 of the crankshaft 120 to the 90° or 12 o'clock position.

Figure 8:
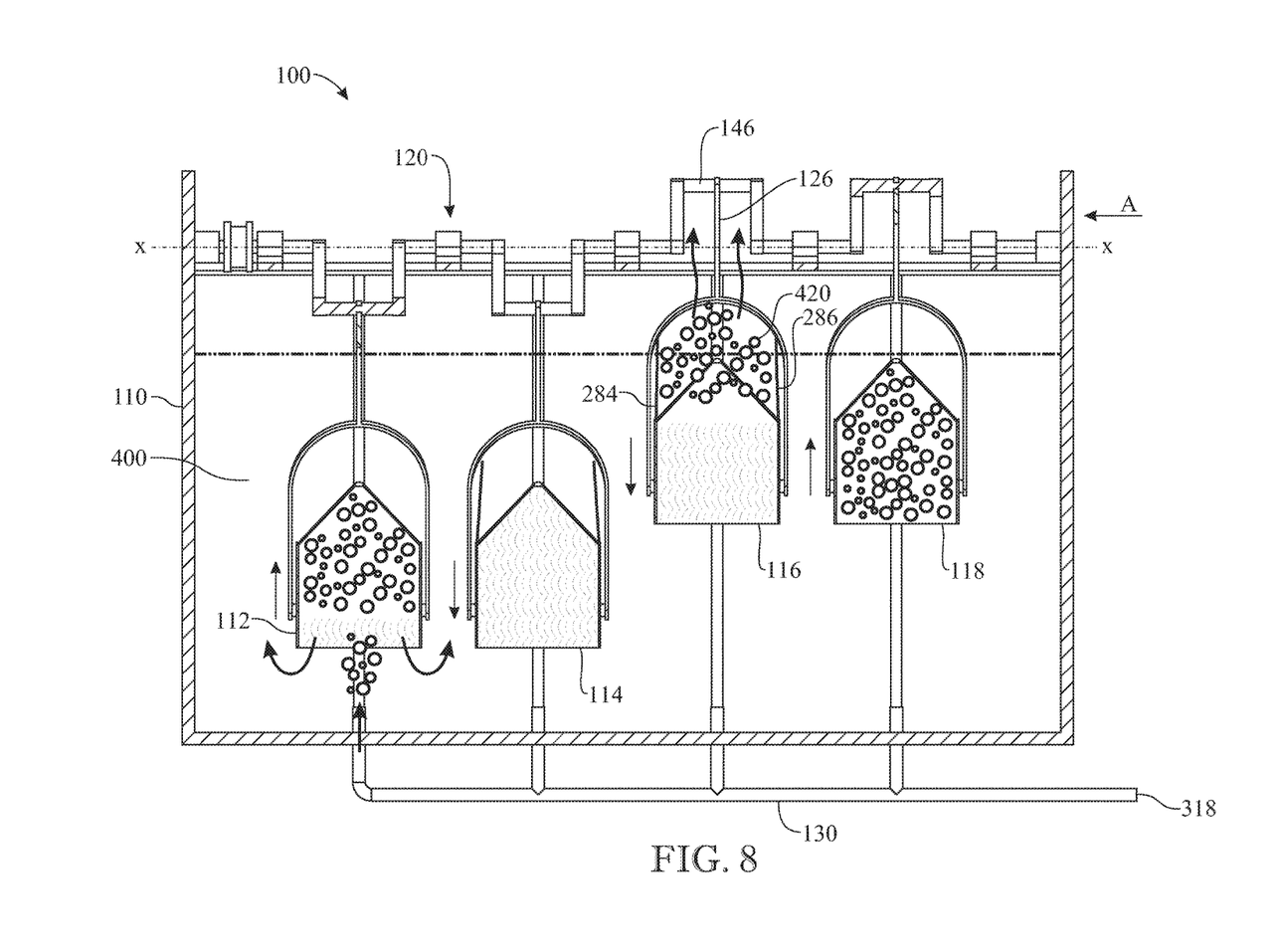
FIG. 8 presents a cross-sectional front elevation view of the gas-powered apparatus of FIG. 1 in a sixth stage of the power cycle.

Referring to FIG. 8, as the gas 420 starts to escape from the interior cavity 290 of the third piston 116 through the trap doors 284 and 286, the weight of the third piston 116 starts to overcome the buoyant effect of the surrounding water 400 and the third piston 116 starts to sink through the water column. As shown, the crank pin 146 has rotated to a 45° position when viewed in the direction of arrow A.

Figure 9:
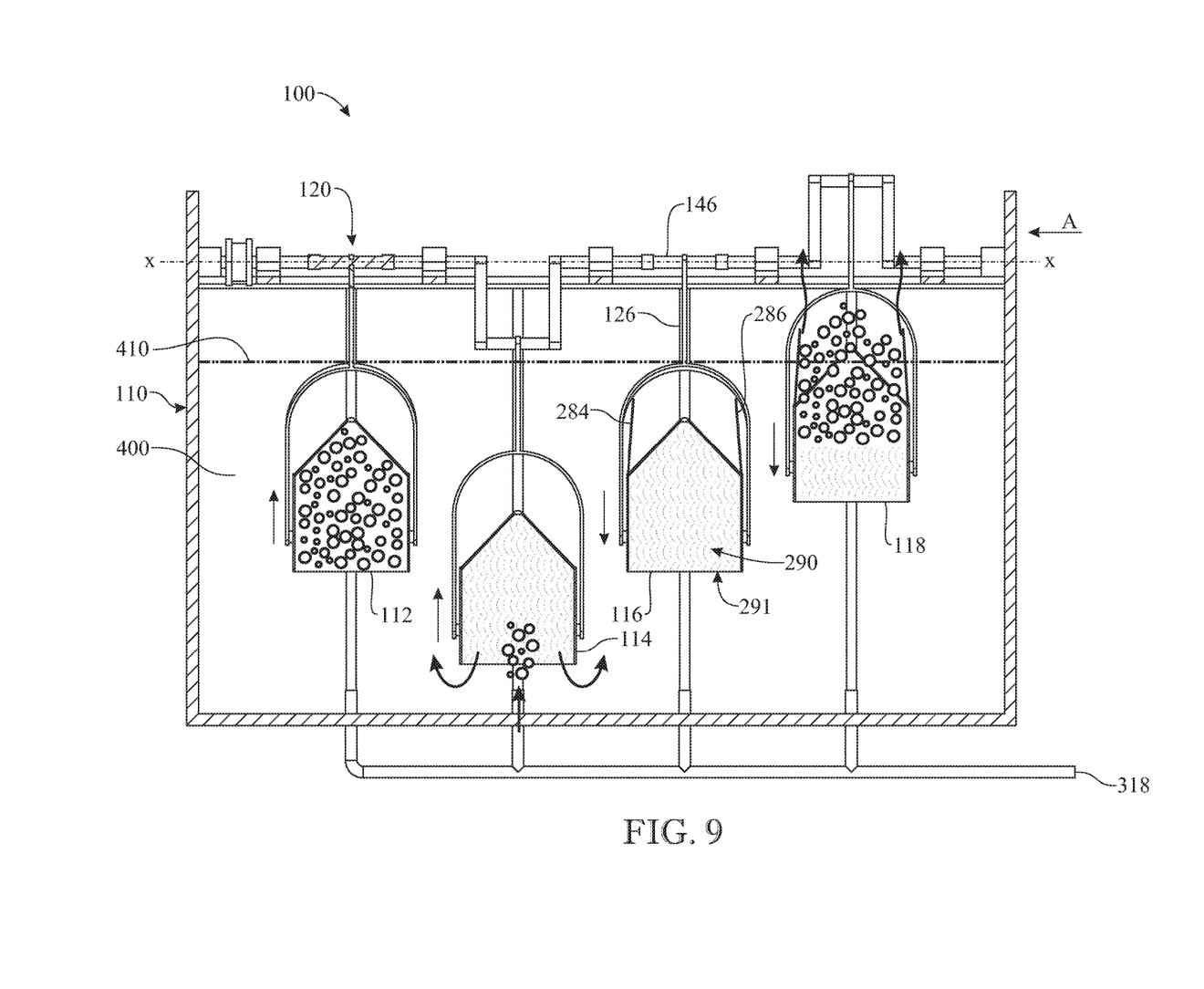
FIG. 9 presents a cross-sectional front elevation view of the gas-powered apparatus of FIG. 1 in a seventh stage of the power cycle.

As best seen in FIG. 9, eventually, the interior cavity 290 is devoid of the gas 420, and water 400 has once again filled the interior cavity 290 of the third piston 116 through the trap doors 284 and 286 and up through the open bottom 291 of the third piston 116. Being denser than the surrounding water 400, the third piston 116 continues to sink down through the water column, pulling the third crank pin 146 to continue rotating clockwise and continue to rotate the crankshaft 120. The illustration of FIG. 9 specifically shows the third crank pin 146 in a 0° position. As the third piston 116 moves downward, the pivoting trap doors 284 and 286 remain open due to the upward pressure exerted by the water 400 inside the interior cavity 290 of the third piston 116.

Figure 10:
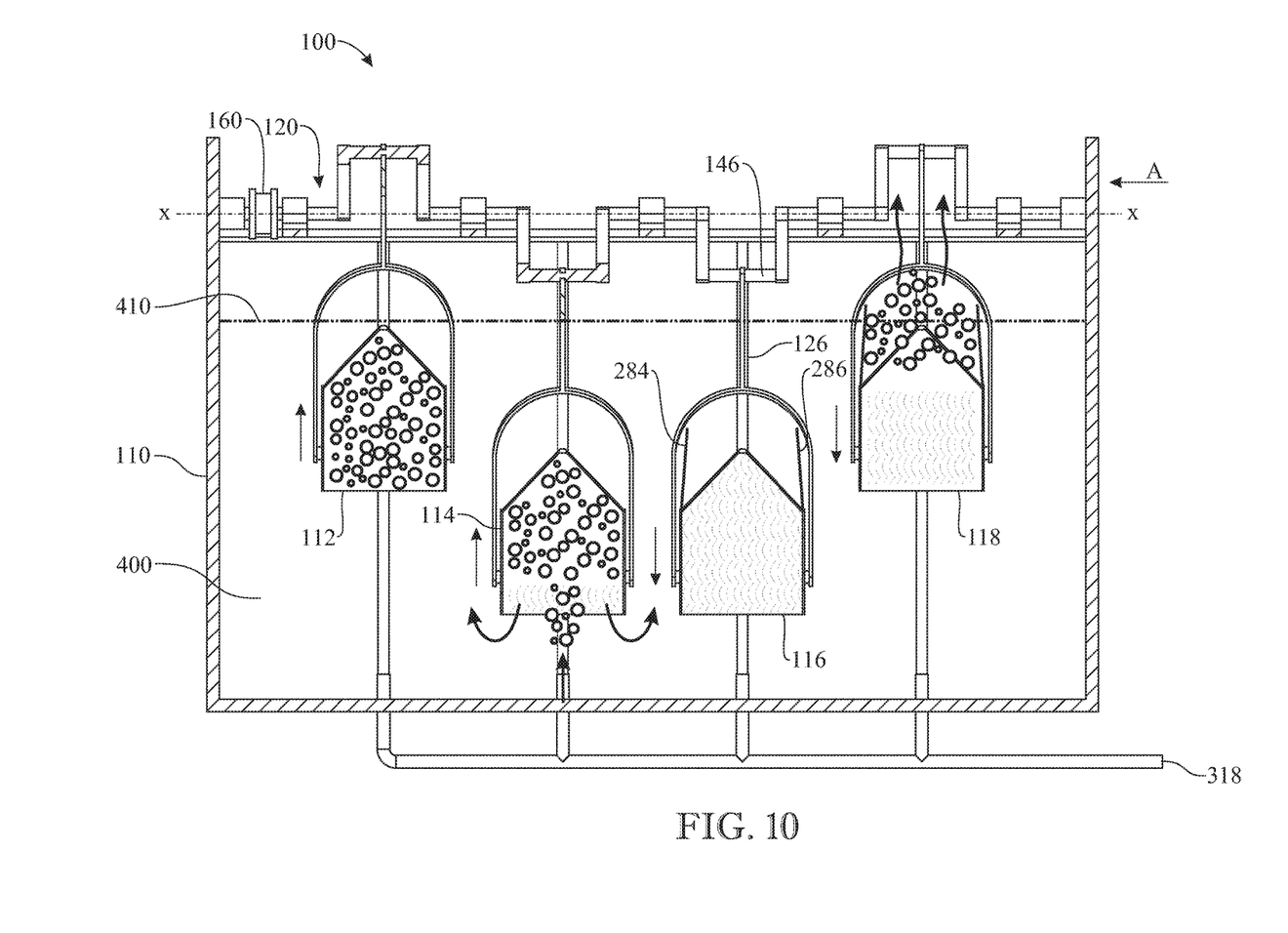
FIG. 10 presents a cross-sectional front elevation view of the gas-powered apparatus of FIG. 1 in an eighth stage of the power cycle.

Referring now to FIG. 10, the sinking third piston 116 continues to fall through the water column rotating the third crank pin 146 to through a 315° position. Once the third piston 116 has reached the bottom of its travel, it is returned to the position of FIG. 3 and is again started to fill with gas 420 from the gas supply system 130 to initiate a new cycle. Upon reaching its lowest position within the water column, the trap doors 284 and 286 can move of their own accord to the closed position due to the fact that they are denser, and thus weigh more, than the surrounding water 400. Alternatively, should the third piston 116 not be denser than the surrounding water 400, the trap doors 284 and 286 will move to the closed position as soon as the third piston 116 starts moving upward.

The remaining pistons function identically during the entire cycle described hereinabove for the third piston 116 but operate at different degrees in their cycles with respect to the third piston 116. For example, the first piston 112 is 180° out of rotation from the third piston 116 while the second and fourth pistons operate at 270° and 90° out of rotation relative to the third piston 116 to continuously rotate the crankshaft 120. It should be noted that the rotation of the crankshaft 120 is continuous even though the above description and accompanying drawings only illustrate 45° increments in the rotation. Gas 420 is injected into each of the pistons at the appropriate point in their cycle and the pistons release the gas through their trap door upon reaching the top of the water level.

In this manner, the gas-powered apparatus 100 is able to generate rotational power to the drive wheel 160 to power external devices while minimizing drag on the system due to the water in the tank 110. It should be noted that the disclosed system can be adapted to provide a rocker type motion or other motions to power a variety of external devices. Further, other fluids than water having different densities as well as other gasses than air, such as, for example, helium, etc. having densities less than ambient air may be provided to the system to increase power to the crankshaft.

Alternative embodiments are contemplated to those shown in the drawings. For instance, the system can include any number of pistons, preferably greater than or equal to two. In addition, the piston shape and size can vary. The pistons can include a different top valve mechanism which closes by outside liquid pressure and opens by inside gas pressure similarly to the aforementioned trap doors. The size and shape of the open bottom of the pistons may also vary.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalents.

What is claimed is:

1. A gas-powered apparatus, comprising:
a volume of liquid disposed below a liquid level;
a crankshaft, comprising a main shaft extending along a longitudinal axis and rotatable about said longitudinal axis;
one or more hollow pistons movably disposed within said liquid and connected to the crankshaft offset from said longitudinal axis of said main shaft, each piston of the one or more hollow pistons having an interior cavity, a movable top comprising one or more freely pivotable trap doors arranged at a top area of the piston, and a bottom; and
a gas supply system for selectively injecting gas to the interior cavity of each piston of the one or more hollow pistons, the gas having a density less than that of the liquid; wherein
the apparatus is configured to adopt a first configuration in which the gas supply system is injecting gas into the interior cavity of at least one piston of the one or more hollow pistons while the movable top of the at least one piston is arranged in a closed position preventing fluid flow between the interior cavity and the outside of the piston through the top area of the piston, and further in which the gas injected into the interior cavity provides buoyancy to the at least one piston driving the at least one piston upward exerting a torque on the crankshaft.

2. The apparatus of claim 1, wherein, in the first configuration, the bottom of the at least one piston is open and the gas supply system is injecting gas into the interior cavity through said open bottom forcing liquid out of the interior cavity through said open bottom.

3. The apparatus of claim 1, wherein the crankshaft is rotatably mounted above said liquid level.

4. The apparatus of claim 1, wherein the movable top is configured to remain in said closed position by the effect of pressure exerted on the movable top by water arranged outside the piston and adjacent to the movable top.

5. The apparatus of claim 1, wherein the apparatus is configured to adopt a second configuration in which the at least one piston is arranged vertically higher than in the first configuration and at least partially above the liquid level, and further in which pressure of the gas injected into the interior cavity is opening the movable top allowing said gas injected into the interior cavity to exit the interior cavity through the top area of the piston.

6. The apparatus of claim 1, wherein the apparatus is configured to adopt a further configuration in which the at least one piston is moving downward along the volume of liquid with the movable top in an open position allowing liquid to flow through the piston, via the bottom and the top area of the piston.

7. The apparatus of claim 6, wherein the quotient of the weight of the at least one piston divided by the volume of the at least one piston is greater than the density of the liquid, such that the at least one piston moves downward at least partially due to gravity, driving the crankshaft.

8. The apparatus of claim 1, wherein the bottom of each piston is permanently open.

9. The apparatus of claim 1, further comprising a respective piston rod connecting each piston of said one or more hollow pistons to a respective section of said crankshaft offset from said longitudinal axis of said main shaft.

10. The apparatus of claim 1, wherein the gas supply system comprises a respective outlet positioned beneath said bottom of each piston of the one or more hollow pistons.

11. The apparatus of claim 1, wherein the liquid comprises water.

12. The apparatus of claim 1, wherein the gas comprises air.

13. The apparatus of claim 1, wherein the one or more hollow pistons comprise two or more hollow pistons, and further wherein each piston of the two or more hollow pistons is connected to respective sections of the crank shaft angularly spaced apart a constant angle from one another about the longitudinal axis of the main shaft.

14. The apparatus of claim 13, wherein each piston of the two or more hollow pistons is connected to the respective section of the crank shaft by a respective piston rod.

15. The apparatus of claim 14, wherein each respective piston rod includes a shaft connected to the respective section of the crank shaft and a saddle rotatably connected to said each piston.

16. The apparatus of claim 1, further comprising a set of vertical rails and each piston of the one or more hollow pistons includes linear bushings movably mounted to the set of vertical rails.

17. A gas-powered apparatus, comprising:
a tank containing a volume of liquid below a predetermined liquid level;
a crankshaft rotatably mounted above said liquid level, said crankshaft having a main shaft extending along a longitudinal axis and rotatable about said longitudinal axis;
one or more hollow pistons movably disposed within said liquid in said tank and connected to the crankshaft offset from said longitudinal axis of said main shaft each piston of the one or more hollow pistons having an interior cavity, a movable top comprising one or more freely pivotable trap doors arranged at a top area of the piston, and an open bottom; and
a gas supply system for selectively injecting gas to the interior cavity of each piston of the one or more hollow pistons, the gas having a density less than that of the liquid; wherein
the apparatus is configured to adopt a first configuration in which the gas supply system is injecting gas into the interior cavity of at least one piston of the one or more hollow pistons while the movable top of the at least one piston is arranged in a closed position preventing fluid flow between the interior cavity and the outside of the piston through the top area of the piston, and further in which the gas injected into the interior cavity provides buoyancy to the at least one piston driving the at least one piston upward exerting a torque on the crankshaft.

18. A method of rotating a crankshaft comprises the steps of:
providing a tank having a rotatable crankshaft, the crankshaft having a main shaft extending along a longitudinal axis and rotatable about said longitudinal axis, the tank further containing one or more movable, hollow pistons connected to the crankshaft offset from said longitudinal axis of said main shaft, each piston of the one or more hollow pistons having an interior cavity, a movable top comprising one or more freely pivotable trap doors arranged at a top area of the piston, and an open bottom;

filling the tank with a liquid up to a liquid level arranged beneath the crankshaft such that the one or more pistons are disposed within the liquid;

positioning at least one piston of the one or more hollow pistons at a bottom position within the tank;

injecting gas into the interior cavity of the at least one piston while the movable top of the at least one piston is arranged in a closed position preventing fluid flow between the interior cavity and the outside of the piston through the top area of the piston, said gas injection causing the at least one piston to rise within the tank to rotate the section of the crankshaft about the longitudinal axis of the main shaft of the crankshaft;

when said at least one piston reaches the liquid level, allowing the movable top to open due to an underlying pressure from the gas contained within the interior cavity of the at least one piston and permitting the release of the gas from the interior cavity of the at least one piston; and continuing to rotate the section of the crankshaft about the longitudinal axis of the main shaft of the crankshaft as the at least one piston sinks through the liquid in the tank with the movable top open in an open position allowing liquid to flow through the piston, via the open bottom and the top area of the piston.

\* \* \* \* \*